(12) United States Patent
John Thomas et al.

(10) Patent No.: US 12,532,167 B2
(45) Date of Patent: Jan. 20, 2026

(54) VALIDATED SENDER MOBILE MESSAGING

(71) Applicant: Syniverse Technologies, LLC, Tampa, FL (US)

(72) Inventors: Rajan John Thomas, Sanford, FL (US); Chris Wright, Plant City, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 31 days.

(21) Appl. No.: 18/398,934

(22) Filed: Dec. 28, 2023

(65) Prior Publication Data
US 2024/0137759 A1 Apr. 25, 2024

Related U.S. Application Data

(63) Continuation of application No. 18/353,563, filed on Jul. 17, 2023, now Pat. No. 11,930,357.
(Continued)

(51) Int. Cl.
*H04W 12/0471* (2021.01)
*H04W 12/0431* (2021.01)
*H04W 12/72* (2021.01)

(52) U.S. Cl.
CPC ... *H04W 12/0471* (2021.01); *H04W 12/0431* (2021.01); *H04W 12/72* (2021.01)

(58) Field of Classification Search
CPC ......... H04W 12/0471; H04W 12/0431; H04W 12/72; H04W 12/69; H04W 12/73; H04W 12/75; H04W 12/068; H04W 12/069
See application file for complete search history.

(56) References Cited

U.S. PATENT DOCUMENTS

2009/0111433 A1* 4/2009 Muhonen ............... H04L 51/58
  455/414.1
2009/0210501 A1   8/2009 Risher et al.
(Continued)

FOREIGN PATENT DOCUMENTS

EP   3989622 A1   4/2022

OTHER PUBLICATIONS

Communication pursuant to Article 94(3) EPC issued Oct. 10, 2024 for corresponding European Patent Application No. 23187390.2.
(Continued)

*Primary Examiner* — Quazi Farooqui
(74) *Attorney, Agent, or Firm* — Anton J. Hopen; Trenam Law

(57) ABSTRACT

This invention is a system and method for verifying a sender of messages on a mobile network. Software on a cloud messaging service generates a public/private key pair. The private key is securely retained in a cloud wallet service and is accessible to a messaging cloud service (the trusted sender). The public key is shared with a subscriber device that receives messages from the messaging cloud service. The cloud messaging service receives an inbound message for the subscriber device from a trusted enterprise application via a secure connection. The cloud messaging service signs a special header to the message with its private key. When the message is received by the subscriber device, the public key resident on the device verifies the message header signed with the public key of the cloud messaging service thereby verifying the sender.

14 Claims, 5 Drawing Sheets

Related U.S. Application Data

(60) Provisional application No. 63/394,143, filed on Aug. 1, 2022.

(56) References Cited

U.S. PATENT DOCUMENTS

| | | | |
|---|---|---|---|
| 2012/0204032 A1* | 8/2012 | Wilkins | H04L 63/0428 |
| | | | 713/170 |
| 2019/0373107 A1 | 12/2019 | Moshir et al. | |
| 2020/0193028 A1* | 6/2020 | Norem | G06F 21/572 |
| 2020/0220730 A1 | 7/2020 | Hudson et al. | |

OTHER PUBLICATIONS

Extended European Search Report issued Dec. 8, 2023 for corresponding European Patent Application No. 23187390.2.

\* cited by examiner

Trusted Sender Verification

VALIDATED SENDER MOBILE MESSAGING

PRIORITY CLAIM

This application claims priority to U.S. Non-Provisional patent application Ser. No. 18/353,563 filed Jul. 17, 2023 and entitled "Trusted Sender Signature Messaging System" which, in turn, claims priority to U.S. Provisional Patent Application Ser. No. 63/394,143 filed Aug. 1, 2022, entitled "Trusted Sender Signature Messaging System."

BACKGROUND OF THE INVENTION

1. Field of the Invention

This invention relates generally to the field of telecommunications networks, specifically to providing trust provisioning and verification for messaging between enterprise services and mobile devices.

2. Brief Description of the Related Art

SMS and MMS messaging on mobile phone networks around the world are connected to each other through the Signaling System No 7 (SS7) protocol. SMS messaging from enterprise applications to subscriber mobile devices may include both public and private information. Private information may include personal information relating to the subscriber, security information used for authentication and authorization on enterprise system or the like. SMS spoofing is a technique in which an attacker sends an SMS (Short Message Service) message pretending to be from a different sender or source. This can be done by manipulating the sender ID. The Sender ID is the name or number that identifies the sender of an SMS message. It is a feature used in SMS marketing and other messaging systems to provide a recognizable identifier for the recipient. The Sender ID can appear on the receiver's device as the name or number in the 'from' field. There are several types of Sender IDs. An alphanumeric Sender ID contains both letters and numbers and can be up to 11 characters long. It is commonly used by businesses because it can be customized to display the company's name or brand. However, an alphanumeric sender ID is generally non-repliable, meaning that recipients can't respond to messages sent with this ID. A numeric Sender ID only contains numbers. It can be a long code (usually 10 digits) or a short code (typically 5-6 digits). These Sender IDs are often used when the sender wants to enable replies or when the recipient is located in a country that doesn't support alphanumeric Sender IDs. Long codes are typically standard phone numbers and are used for person-to-person communications. Short codes are special numbers, typically 5-6 digits long, that are used for mass communications. They're easier to remember than long codes, but acquiring them can be a complex and expensive process, as they're usually shared or leased. A global title might be used as a Sender ID. The global title is an internationally standardized identifier that is used to route messages in advanced telecommunications networks. Finally, network-specific codes are special codes or identifiers for specific services or functions.

SMS spoofing often involves impersonating a user that has roamed into a foreign network and submits messages to a home network. A user receiving fraudulent messages may be tricked into replying with confidential information to an untrustworthy recipient. What is needed is a system to verify a message source or sender as trusted.

SUMMARY OF THE INVENTION

The present invention includes a method of verifying a sender as trusted on a mobile network. A cloud messaging service receives a message from an enterprise service destined for a mobile subscriber device. The cloud message service may pass the message through an SMS gateway operating the SS7 protocol. However, the cloud message service wants to establish itself as a verified sender and the cloud message service already established the enterprise service was trusted. Without some verification indicia on the subscriber device the end user of the subscriber device has no feedback on the validity of the sender of the received message. To address this, the cloud service provider generates a public/private key pair not to encrypt the message but sign a header passed along with the message establishing the identity of the enterprise service as the sender. In asymmetric encryption a private key may be used to decrypt data locked by a public key and but also to create a digital signature with the private key and verified by the public key. The digital signature is essentially a hash (MD5, SHA1, etc.) of data (file, message, header) that is encrypted with the cloud messaging service's private key. At the subscriber device, the header signature is decrypted with the public key of the cloud message service to determine whether the header is valid. If so, then the sender is considered verified by the subscriber device.

In order to establish a secure communication channel between the cloud messaging service and a trusted application on the subscriber device, a key provisioning method is utilized. This method involves exchanging validation requests and responses between the trusted application, cloud messaging service (CMS), and an original equipment manufacturer (OEM) cloud service. Key pairs are generated and a CMS public key is provisioned to the trusted application, which facilitates verification.

The invention also encompasses a method for verifying the authenticity of a message transmitted from an enterprise application to a subscriber device through a cloud messaging service. The method includes signing a special header with a private key, attaching it to the message, and delivering the message to the subscriber device. The special header is verified on the subscriber device using a software component that accesses the Trusted Execution Environment (TEE) of the device and the public key to validate the sender. While the specific information hard-coded into the TEE may vary between manufacturers and devices, it generally includes:
  a. Device-specific cryptographic keys: These unique keys are used for encryption, decryption, and authentication purposes. They are essential for secure communication between the device and external services, as well as for verifying the integrity of the device and its software.
  b. Hardware and firmware unique identifiers: These identifiers are used to uniquely identify the device and its components. They can be used for various purposes, such as device registration, licensing, or tracking.
  c. Security mechanisms and algorithms: These may include cryptographic algorithms, random number generators, and other security-related functions that are necessary for secure operation.
  d. Secure boot process: The TEE may contain a secure boot process that verifies the integrity of the operating system and other critical software components before they are executed. This helps protect the device from unauthorized modifications and malware.

e. Secure storage: The TEE may provide a secure storage area for sensitive data, such as cryptographic keys, certificates, and other security-related information.

A processor manufacturer (i.e., the OEM cloud service) can validate whether a TEE on a device is valid. The manufacturer has detailed knowledge about the design, architecture, and implementation of the TEE, as well as access to the unique hardware identifiers and cryptographic keys that are embedded within the device during production. To validate the TEE, the manufacturer can use a process called attestation. Attestation is a mechanism through which a device can provide evidence of its hardware and software configuration and prove its identity to a remote party, such as the manufacturer or a service provider. This evidence, in the form of a device identity blob, includes the device's unique identifiers, hardware configuration, and other relevant information, and is signed with the device's private OEM key. The processor manufacturer, having access to the public device OEM key corresponding to the device's private OEM key, can verify the signature on the device identity blob. This process ensures that the device identity blob is genuine and originates from a valid TEE on the device.

Validation of a mobile device's Trusted Execution Environment (TEE) can be done through an API provided by the processor manufacturer or a trusted third-party service. These APIs enable communication between the device and the manufacturer's OEM Cloud service, allowing the device to send device identity blob and the manufacturer to verify their authenticity. Typically, the attestation process involves the following steps:

a. The mobile device generates a device identity blob containing information about the device's hardware and software configuration, and signs it with the device's private OEM key. In an embodiment of the present invention, a trusted application running on the subscriber device uses a software component or SDK provided by the processor manufacturer to access the TEE.

b. The device sends the device identity blob to the manufacturer's cloud service through the API.

c. The manufacturer's cloud service verifies the signature on the device identity blob using the corresponding public OEM key.

d. If the signature is valid, the OEM cloud service returns a token indicating the authenticity of the device's TEE.

By using an API, the device identity process can be automated and seamlessly integrated into applications and services that require validation of a device's TEE. This ensures secure communication and trust between the mobile device and the services that rely on the TEE's integrity.

BRIEF DESCRIPTION OF THE DRAWINGS

For a fuller understanding of the invention, reference should be made to the following detailed disclosure, taken in connection with the accompanying drawings, in which.

DETAILED DESCRIPTION

In the following detailed description of the preferred embodiment, reference is made to the accompanying drawings, which form a part hereof, and within which specific embodiments are shown by way of illustration by which the invention may be practiced. It is to be understood that other embodiments may be utilized, and changes may be made without departing from the scope of the invention.

Figure 1:
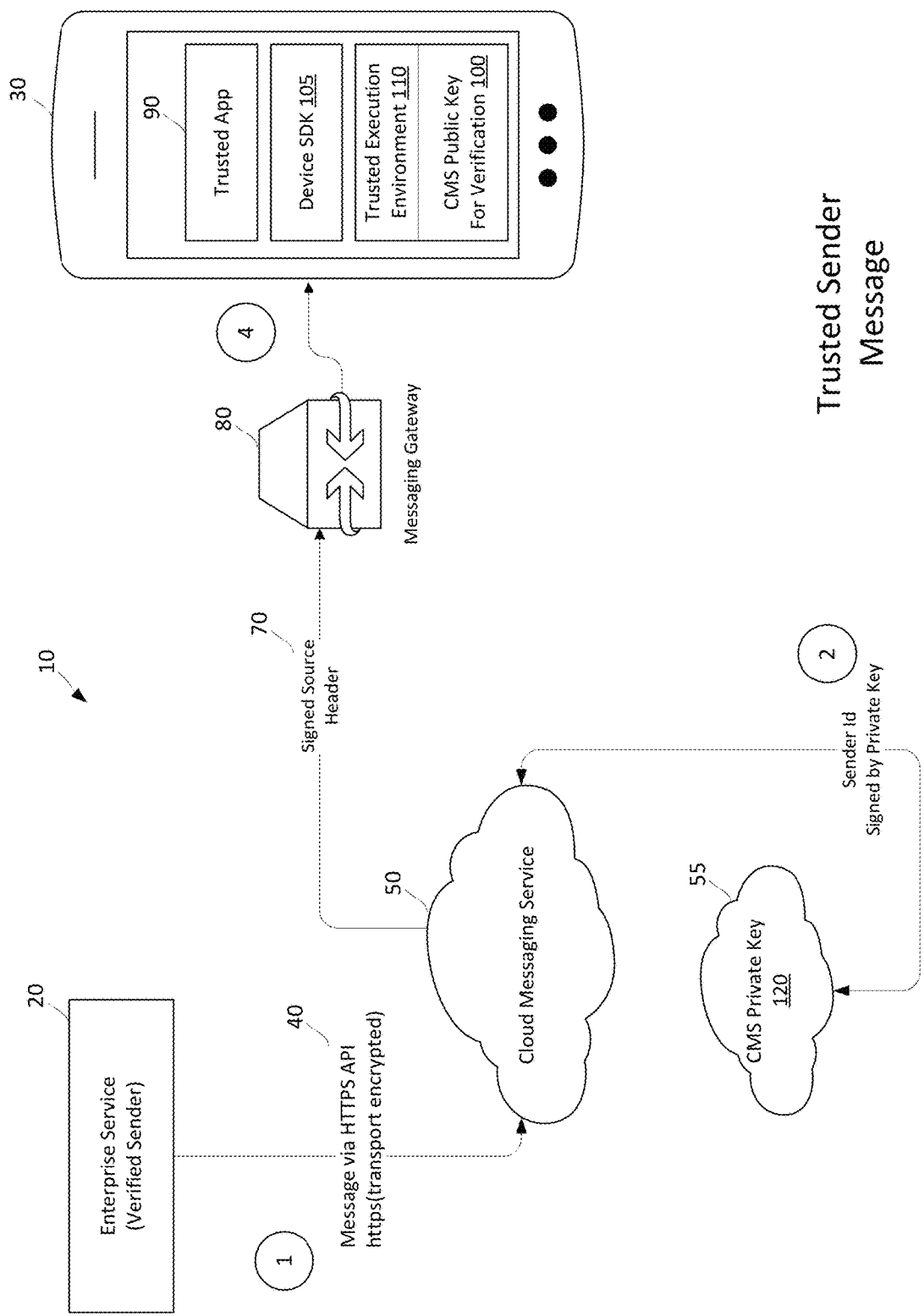
FIG. 1 is a diagrammatic view of an embodiment of the invention verifying a message sender.

FIG. 1 provides a schematic depiction of an embodiment of the invention denoted generally as reference numeral 10. An enterprise application 20 wants to send sensitive information to subscriber device 30. This could be a PIN, password, financial statement, healthcare diagnosis or the like. The message is received at a cloud messaging service 50 through an HTTPS API 40 which is encrypted. Accordingly, the first leg of the journey is, in fact, secure and trusted. Cloud messaging service 50 previously generated a public/private key pair wherein the private key 120 stored in cloud wallet service 55 is accessible by cloud messaging service 50 and used to create a digital signature of the verified sender id in the source header 70 of the message before it is sent through messaging gateway 80 and to subscriber device 30. CMS public key 100 on subscriber device 30 is used to verify source header 70 and determine whether the sender (enterprise service 20) is verified or not.

Figure 2:
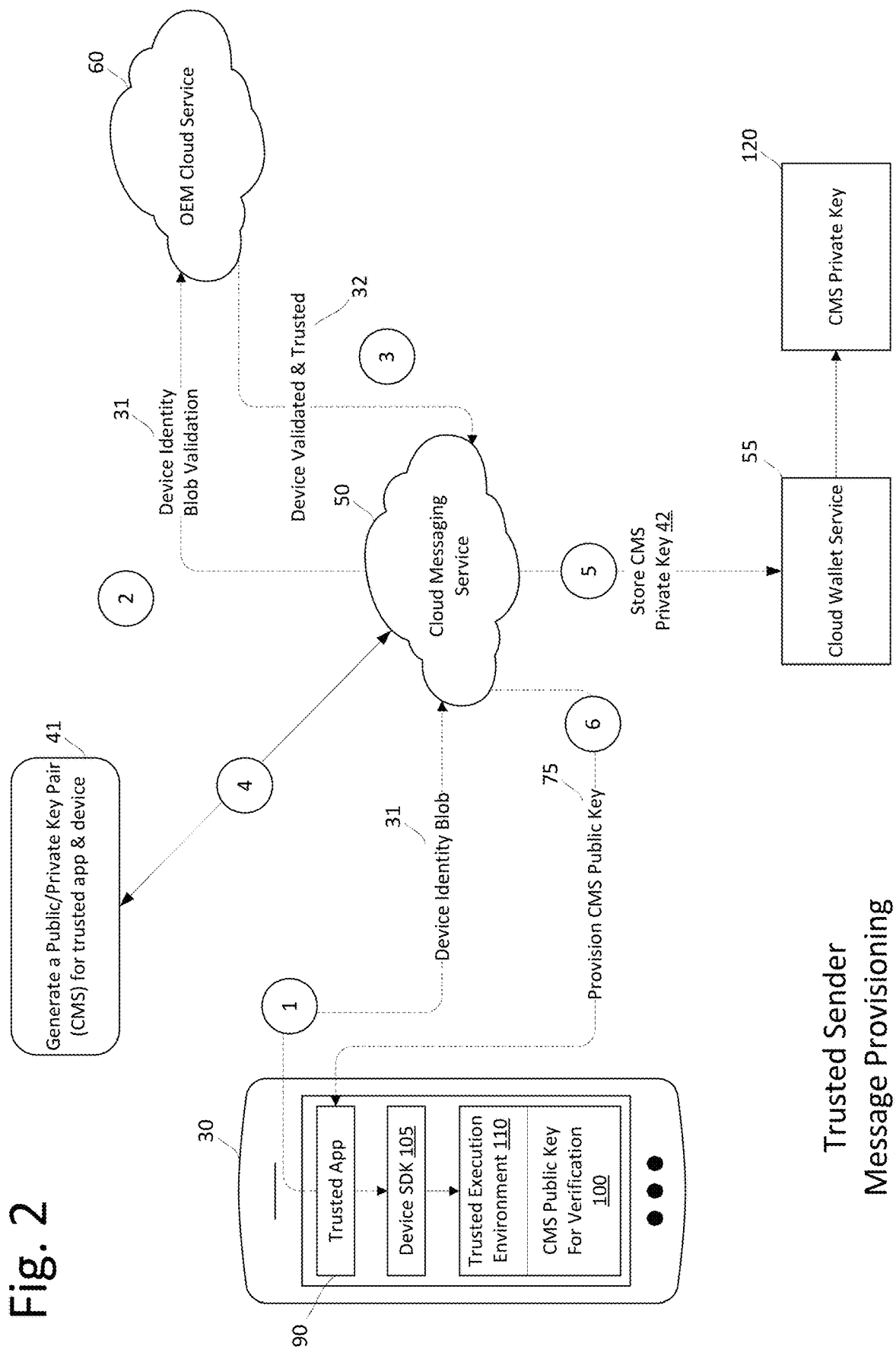
FIG. 2 is a diagrammatic view of an embodiment of the invention provisioning the public/private keys for the cloud message service and subscriber device.
Figure 3:
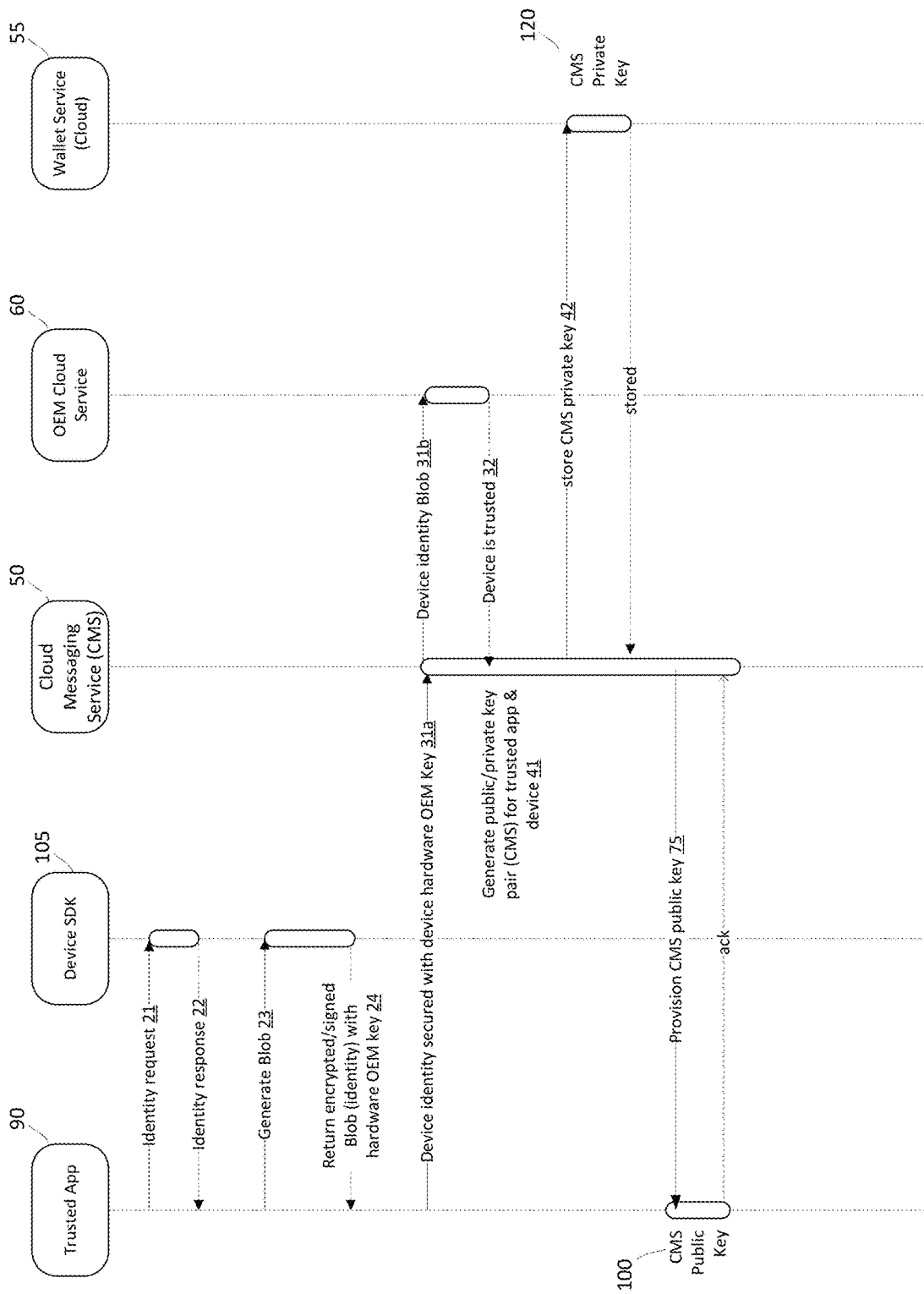
FIG. 3 is a call flow diagram of an embodiment of the invention for provisioning the public/private keys for the cloud message service and subscriber device.

FIGS. 2-3 show the provisioning process according to an embodiment of the invention. Trusted application 90 sends a validation request to an SDK 105 on the subscriber device 30 that provides access to a trusted execution environment 110 (TEE) on the subscriber device. The SDK 105 provides validation response back to the trusted application 90 which then sends another validation request to a cloud messaging service 50 as a device identity blob 31. The cloud messaging service then sends the device identity blob 31 to an OEM cloud service 60 which provides validation of the device through immutable information in the TEE. OEM cloud service 60 sends a validation report 32 back to cloud messaging service 50 which then generates a key pair and stores the CMS private key 42 on the wallet service 55. The CMS Public key 75 is then sent to the subscriber device 30, which is stored in the TEE 100. As shown in FIG. 3, trusted application 90 makes an identity request 21 to device SDK 105. Device SDK 105 returns an identity response 22 to trusted application 90. Trusted application 90 generates an identity blob 23 which is sent to device SDK 105 which returns an encrypted/signed blob (identity) 24 encrypted and signed with the hardware OEM key of the device 30. The device identity secured with the hardware OEM key is sent 31*a* from trusted application 90 to cloud messaging service 50. The device identity secured with the hardware OEM key is sent 31*b* again from the cloud messaging service 50 to the OEM cloud service 60. If validated, the OEM cloud service 60 returns a response 32 that the device 30 is trusted. Cloud messaging service 50 then generates a CMS public/private key pair 41 for trusted application 90 and device 30. The CMS private key is stored 42 in a cloud wallet service 55 and the CMS public key 75 is provisioned back to device 30.

Figure 4:
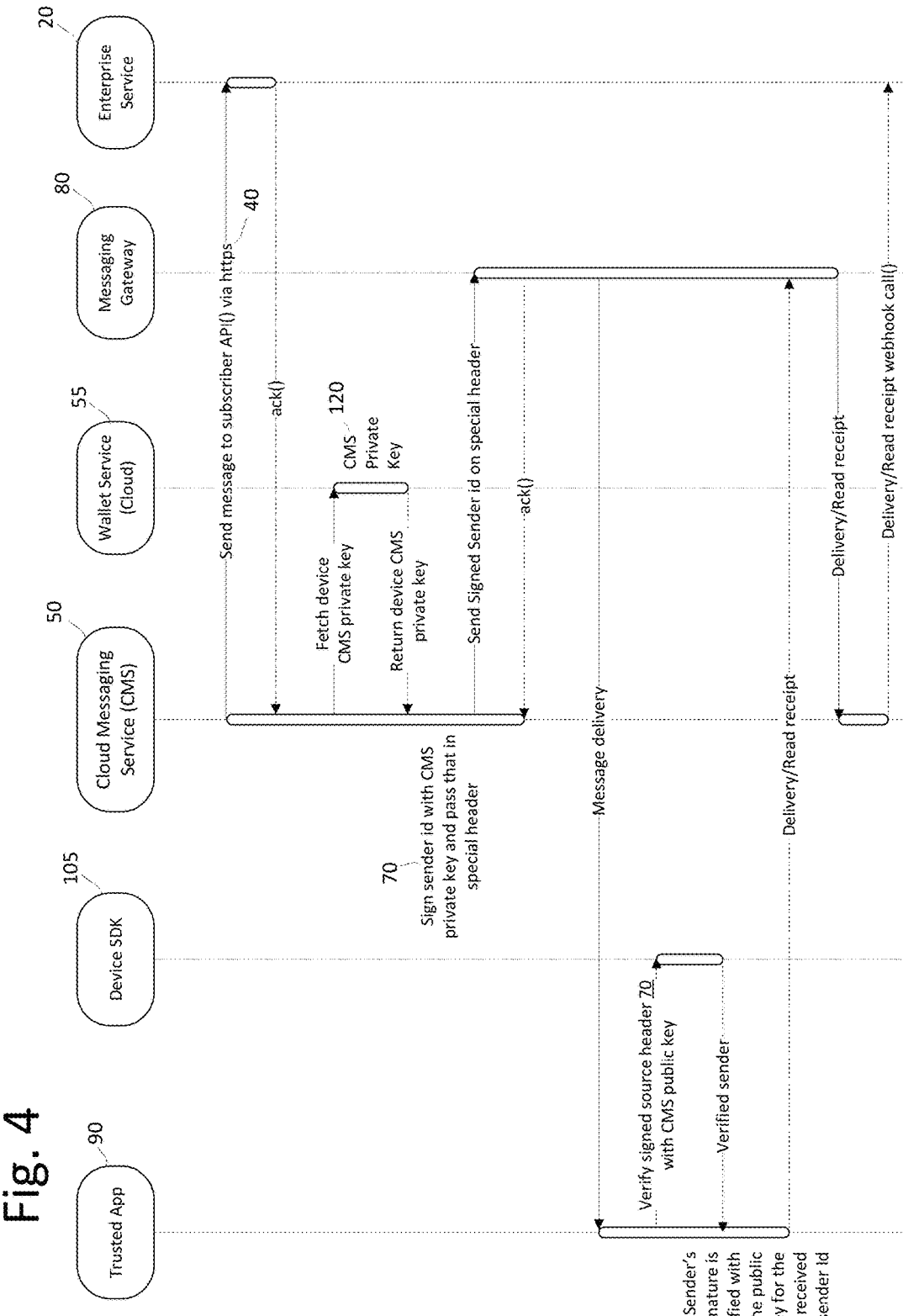
FIG. 4 is a call flow diagram of an embodiment of the invention signing an SMS message header by the cloud messaging service.
Figure 5:
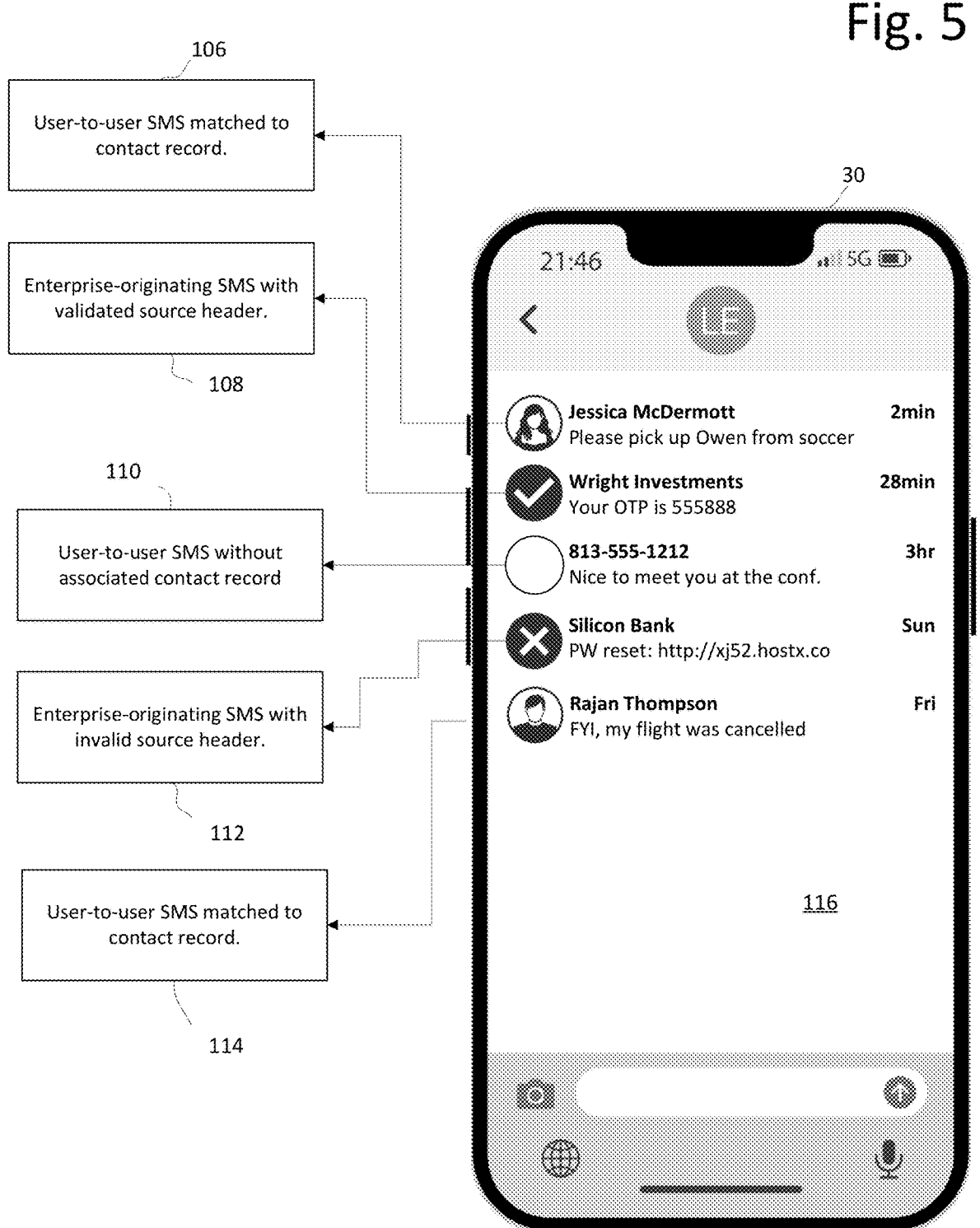
FIG. 5 is a user interface rendering on a mobile device displaying indicia responsive to verification or non-verification of messaging according to an embodiment of the invention.

FIGS. 4-5 demonstrate the verification process once the provisioning (shown in FIGS. 2-3) is completed. Enterprise service 20 transmits a message to cloud messaging service 50 via a secure connection 40 wherein the enterprise service 20 is known, authenticated and authorized by the cloud messaging service 50. If the message was simply sent onto the Messaging gateway 80 without more it would be more difficult for subscriber device 30 to verify the sender (cloud messaging service 50). Therefore, before the message is sent to the Messaging gateway 80, the cloud messaging service 50 fetches a private key 120 from cloud wallet service 55. A special header 70 is signed with private key 120 and the message and special header are forwarded to message gateway 80. Message gateway 80 then delivers the message to the subscriber device 30. Trusted application 90 verifies the signed source header 70 through SDK 105 which accesses the TEE 110 and CMS public key 100 to verify the sender. Thus, the sender's signature is verified with the public key for the received sender id. The delivery/read receipt then then transmitted back to message gateway 80 which then confirms this to cloud messaging service 50. Cloud messaging service 50 confirms the delivery/read receipt back to enterprise service 20 which was the originator of the message. It should be noted that SMS is just one message format going through an SS7 protocol gateway. Other formats may be employed such as MMS.

FIG. 6 shows subscriber device 30 displaying user interface 116 with a list of five received SMS messages. From top to bottom, the first message is a user-to-user message with a known contact to the subscriber device 30 which includes a visual indicia of the sender's photo. The second message received is a 2FA response 108 from an enterprise service for a banking application. In this case, the verification process signed the header of the SMS message which is then verified by the trusted application 90 and TEE device SDK 105 using the public key to validate the private key signature of the cloud messaging service 50. Accordingly, a check-mark indicia is shown in association with the verified SMS message on the user interface 116 to convey to the end user that the message has be validated as authentic. The third message in another user-to-user SMS message 110 that does not go through the authentication process nor did the subscriber device have a preexisting contact record to associate with the SMS header. The fourth message 112 is one sent by an enterprise service but fails the verification process wherein the subscriber device 30 is shown with a cautionary indicia of an "X" to warn the end user not to trust the message authenticity. Finally, the fifth message 114 is one similar to the first, a user-to-user message wherein the subscriber device 30 has an associated contact record for the SMS sender but is it not verified by the process claimed in this application as it did not originate from an enterprise service.

To augment the existing secure transmission process, an embodiment can include a method to safeguard the actual content of the SMS or MMS message using a secondary signature mechanism. It is similar to the process described previously, but with the added step of generating an additional digital signature for the content of the message. This second signature is distinct from the one used for the source header, providing an added layer of protection. As the enterprise service 20 sends sensitive information through HTTPS API 40 to the cloud messaging service 50, the information is already secured by the HTTPS protocol, keeping the first leg of the journey secure and trusted. In addition to the private key 120, accessible by the cloud messaging service 50 and used to create a digital signature in the source header 70, an additional (or same) private key, also stored in the cloud wallet service 55, is used to generate a second signature associated with the actual content of the message. This secondary signature is placed in a specific field in the header, different from the one used for the source header signature. As a result, the message contains two distinct signatures: one that verifies the authenticity of the sender and one that protects the integrity of the message content.

When the SMS message is received on the subscriber device 30, the operator application or trusted application 90 verifies both the sender's signature and the message content signature. This double-check ensures not only that the message comes from a verified sender, but also that the content of the message has not been tampered with during transmission. As in the previous embodiment, delivery and read receipts can be sent back to the originating enterprise service 20, giving the sender assurance that the message was delivered and read. This additional embodiment using a second signature for the message content thus enhances the security of the messaging system, giving both the sender and the recipient an additional layer of trust and confidence.

Hardware and Software Infrastructure Examples

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premise or remote such as in the "cloud" through vendors operating under the brands, MICROSOFT AZURE, AMAZON WEB SERVICSE, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like. Hardware equipment may be agnostic as to general computing or may be telecommunications-specific. Some equipment providers include those under the brands HUAWEI, CISCO SYSTEMS, NOKIA, and QUALCOMM.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object-oriented programming language such as Java, C #, C++, Visual Basic or the like and conventional procedural programming languages, such as the "C" programming language or similar programming languages. Additional languages like ERLANG (or Open Telecom Platform, OTP) may be used or scripting languages such as PYTHON, LUA and PERL.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Terms

Access Point Name (APN) refers to a gateway between a GSM, GPRS, 3G or 4G mobile network and another computer network, frequently the public Internet. The APN identifies the packet data network (PDN) that a mobile data user wants to communicate with. In addition to identifying a PDN, an APN may also be used to define the type of service.

Application Function (AF) is a logical element of the 3GPP policy and charging control (PCC) framework which provides session related information to the policy and charging rules function (PCRF) in support of PCC rule generation.

Asymmetric Cryptography (public/private-key cryptography) means a process that uses a pair of related keys to encrypt (public) and decrypt (private) a message and protect it from unauthorized access or use.

Attestation means providing cryptographically signed evidence about the state of the device and its trustworthiness. Attestation of a mobile device identity using immutable identifying information in the Trusted Execution Environment (TEE) is a process of proving the authenticity and integrity of a mobile device's hardware, software, and identity. This process leverages the TEE, a secure and isolated environment within the mobile device's processor, to provide a high level of security and protection against tampering Immutable identifying information refers to data that cannot be altered or changed after it is generated. In the context of device attestation, this information may include unique device identifiers, cryptographic keys, or hardware-based security features.

Attribute Value Pair (AVP) means an information element of a Diameter Protocol message. Each Diameter message will contain multiple AVPs, such as Destination-Host AVP, Subscription ID AVP, Server-Name AVP, Framed IP Address AVP and the like.

Cloud Messaging Service means a cloud-based platform that enables the sending and receiving of messages between applications, devices, and systems over the Internet. These messaging services may handle various types of messages, such as SMS (Short Message Service), MMS (Multimedia Messaging Service), push notifications, in-app messages, and email.

Diameter is an authentication, authorization, and accounting protocol for computer networks.

Diameter Routing Agent (DRA) is an element in a 3G or 4G (such as LTE) network that enables real-time routing capabilities so that messages are routed among the correct elements in a network. The DRA was launched by the 3GPP to address the increased Diameter signaling traffic and growing sophistication of 4G LTE networks.

Enterprise Service means an SMS messaging platform that businesses use to manage and execute their SMS campaigns. These platforms offer features such as contact list management, message templates, scheduling, and reporting. Some messaging platforms also provide APIs for integration with other business systems. They are used for a number of purposes that include, but are not limited to, marketing, notifications, alerts, customer support, internal communication and two-factor authentication (2FA).

Evolved Node B (eNB or eNodeB) is a base station terminating the air interface on the network side. It is responsible for all radio resource management. It is also responsible for allocation of user traffic to the downlink/ uplink, security and relaying of higher layer NAS (Non-Access Stratum) signaling to the MME.

Evolved Universal Terrestrial Radio Access Network (EUTRAN) is the radio (air interface) access architecture for LTE.

Fully Qualified Domain Name (FQDN) is a domain name that specifies its exact location in the tree hierarchy of the Domain Name System (DNS).

Gateway Mobile Switching Center (GMSC) is a function within a PLMN (Public Land Mobile Network). GMSC terminates the PSTN (Public Switched Telephone Network) signaling and traffic formats. It converts this to protocols used in mobile networks. For mobile terminated calls, GMSC interacts with the HLR (Home Location Register) to retrieve routing information.

General Packet Radio Service (GPRS) is a packet oriented mobile data standard on the 2G and 3G cellular communication network's global system for mobile communications (GSM).

GPRS Tunneling Protocol (GTP) is defined by 3GPP standards to carry General Packet Radio Service (GPRS) within 3G/4G networks.

HLR means Home Location Register which is a database that contains subscription data about subscribers authorized to use the GSM core network. The HLRs store details of every SIM card issued by the mobile phone operator.

Home Public Land Mobile Network (HPLMN) means the network in which a mobile subscriber's profile is held. Mobile users that roam on other networks (visiting) receive subscription information from the HPLMN.

HSS means Home Subscriber Service which implements HLR and Diameter signaling. The HSS is a central database that contains user-related and subscription-related information. The functions of the HSS include functionalities such as mobility management, call and session establishment support, user authentication and access authorization. The HSS is used in IMS and 4G while HLR is used in 2G and 3G.

HTTP Encryption means the process of securing the communication between a client (such as a web browser) and a server (such as a web server) when they exchange data using the HTTP (Hypertext Transfer Protocol) protocol. The primary goal of HTTP encryption is to protect sensitive information from being intercepted, tampered with, or read by unauthorized parties during transmission. The most widely-used method for encrypting HTTP communication is by implementing HTTPS (Hypertext Transfer Protocol Secure), which uses SSL (Secure Sockets Layer) or its successor TLS (Transport Layer Security) to encrypt the data transmitted between the client and the server. HTTPS is essentially the secure version of HTTP, providing end-to-end encryption, data integrity, and authentication.

IMS means IP Multimedia Subsystem, an architectural framework to standardize the delivery of voice and other multimedia services of IP packet-switched networks.

IMSI means International Mobile Subscriber Identity. It is a specification used to uniquely identify a subscriber to a mobile telephone service. It is used internally to a GSM network and is adopted on nearly all cellular networks. The IMSI is a 50-bit field which identifies the phone's home country and carrier and is usually fifteen digits. This 15-digit number has two parts. The first part is comprised of six digits in the North American standard and five digits in the European standard. It identifies the GSM network operator in a specific country where the subscriber holds an account. The second part is allocated by the network operator to uniquely identify the subscriber. For GSM, UMTS and LTE network, this number is provisioned in the SIM card and for CDMA2000 in the phone directly or in the R-UIM card (the CDMA2000 analogue to a SIM card for GSM).

Inbound Roaming means a subscriber of another network "visits" within the local (home) network but is able to use the local network to makes calls, send messages and the like. The inbound roaming service allows subscribers from other operators to access the local network and services.

Interconnect Border Control Function (IBCF) is a boundary control between various service provider networks, providing IMS network security in terms of signaling information. It enables communication between IPv4 and IPv6 SIP applications, controlling transport plane functions, network topology hiding, screening of SIP signaling, selecting an optimum signaling interconnect, and creation of charging data records.

Interrogating Call Session Control Function (I-CSCF) is responsible for onward routing of SIP messages to the appropriate S-CSCF (Serving CSCF) for a given subscriber. It is a key element in the IMS roaming methodology.

IP Short Message Gateway (IPSMGW) is an IMS application server handling SIP based messaging services for IMS subscribers.

Key Pair refers to a set of two related cryptographic keys that are used in asymmetric encryption, also known as public key cryptography. The key pair consists of: (1) a Public Key: This key is made publicly available and is used for encryption. Anyone can use this key to encrypt data or messages intended for the owner of the key pair. Once the data is encrypted using the public key, it can only be decrypted using the corresponding private key. (2) a Private Key: This key is kept secret and is only known to the owner of the key pair. It is used for decryption, allowing the owner to decrypt the data or messages that have been encrypted using their public key. The private key can also be used to digitally sign messages, providing a means of authentication and integrity.

Long-Term Evolution (LTE) is a standard for wireless broadband communication for mobile devices and data terminals, based on the GSM/EDGE and UMTS/HSPA technologies.

Media Gateway (MGW) handles the media plane (voice) in a distributed switch.

Media Gateway Control Function (MGCF) facilitates call control, interfacing the PS domain to the circuit switched domain when interworking between the IMS and PSTN is necessary.

Mobile application part (MAP) is an SS7 protocol used to access the home location register (HLR), visitor location register (VLR), mobile switching center and other components of a mobile network infrastructure.

Mobile Switching Center (MSC) means the primary service delivery node for GSM/CDMA, responsible for routing voice calls and SMS as well as other services. The MSC connects and releases end-to-end connections, administers mobility and hand-over requirements during the call and oversees charging and real-time prepaid account monitoring.

Mobility Management Entity (MME) is a component standardized within the long term evolution (LTE) system. MME provides mobility session management for the LTE network and supports authentication, handovers and roaming between subscribers and other networks.

MSISDN means Mobile Station International Subscriber Directory Number which is provisioned to a mobile device subscriber for making calls. It is the mapping of the telephone number to the SIM card (or CDMA2000 directly in the hardware) in a mobile or cellular phone and is the number normally dialed to connect a call to the mobile device. A SIM card has a unique IMSI that does not change but the MSIDN can change in time (e.g., telephone number portability).

Multimedia Messaging Service (MMS) is a framework to send messages that include multimedia content to and from a mobile phone over a cellular network. The MMS standard extends the Short Message Service (SMS) capability. MMS allows the exchange of text messages greater than 160 characters in length.

OEM Cloud Services enables service providers to manage devices that verify the device identity in addition to several other security-impacting characteristics.

Outbound Roaming typically occurs when a subscriber travels to another country. That subscriber's home network has an agreement with the network he is visiting in the other country. This agreement permits the subscriber to use his mobile phone to make calls and send messages on this visiting network. The subscriber is "outbound roaming" with respect to his home network providers. Concurrently, in the view of the visited network, this subscriber is "inbound roaming." In other words, the inbound roaming service allows subscribers from other operators to access the local network and services. The outbound roaming service allows subscribers from the local network to access another operator's network and services.

Packet Data Network Gateway (PGW) is used to allocate IP addresses to the user equipment during default bearer setup.

Policy and Charging Rules Function (PCRF) is the software node designated in real-time that supports service data flow detection, policy enforcement and flow-based charging.

Proxy Call Session Control Function (P-CSCF) is a SIP proxy that is the first point of contact for user equipment in a mobile network. All SIP traffic to and from the user equipment must go through the P-CSCF. It acts as the ingress and egress point to and from a service provider's IMS domain with respect to the IMS client.

Public Switched Telephone Network (PSTN) means a circuit switched network that is used primarily for voice communications worldwide.

S6a Interface is Diameter interface between MME and HSS in the LTE network providing messages and procedures for phone attachment.

Serving Call Session Control Function (S-CSCF) is the primary node in the IMS handling session control. Subscribers are assigned a S-CSCF for the duration of their IMS registration to facilitate routing of SIP messages.

Serving Gateway (SGW) routes and forwards user data packets. The SGW manages and stores UE contexts, e.g. parameters of the IP bearer service, network internal routing information.

Serving GPRS Support Node (SGSN) is a main component of the GPRS network, which handles all packet switched data within the network.

Session Initiation Protocol (SIP) is a protocol designed to establish, maintain and terminate multimedia sessions. SIP has been adopted as the main signaling protocol in different network architectures. This SIP is deployed in 3GPP IMS (IP Multimedia System).

Short Message Peer-to-Peer (SMPP) Protocol is an open, industry-standard protocol designed for exchanging SMS (Short Message Service) messages between Short Message Service Centers (SMSCs) and external messaging entities like SMS gateways, routing platforms, or messaging applications. SMPP is used in the telecommunications industry for sending and receiving SMS messages over the internet or other IP networks, especially in high-volume or time-sensitive scenarios.

Short Message Service (SMS) is a text message (e.g., string of characters) generally sent from one mobile device to another over the cellular network. SMS is a text-only standard formalized in 1985 in the Global System for Mobile Communications (GSM) standards.

Signal Transfer Point (STP) is a node in an SS7 network (2G and 3G) that routes signaling messages based on their destination point code in the SS7 network.

Source Header (of SMS message) means the "originating address" or "source address" of an SMS message. This address is used to identify the sender of the message and is usually displayed on the recipient's device as the sender's phone number or alphanumeric sender ID. When an SMS message is sent, it contains several pieces of information in its header, such as the originating address, destination address, and message payload. The originating address or source header is an essential part of the SMS message, as it allows the recipient to know who sent the message and potentially reply to it. In some cases, the source header can be a phone number (e.g., a mobile phone number or short code). In other cases such as enterprise service messaging, it can be an alphanumeric sender ID, which is a combination of letters and numbers used to identify the sender, such as a company name or service identifier. The use of alphanumeric sender IDs is common for businesses, as it allows them to brand their SMS messages with their company name or service instead of a generic phone number.

Telephony application server (TAS) means a component used in the core network of a telecom network operator to provide telephony applications and additional multimedia functions. TAS provides the service logic for invoking the media servers to provide the call progress tones and announcements. If the calls originate or terminate on the PSTN, the TAS provides SIP signaling to the MGCF to instruct the media gateways to convert the PSTN TDM voice bit stream to an IP RTP stream and to direct it to the Internet protocol (IP) address of the corresponding IP phone.

Trusted execution environment (TEE) means a secure area of a main processor that ensures the confidentiality and integrity of the data and code executed within it. It isolates sensitive operations and data from the rest of the device's operating system, providing a higher level of security against potential threats and malicious attacks. An enterprise application in a Trusted Execution Environment is a software application designed to meet the specific needs of an organization while leveraging the security benefits of a TEE. These applications are developed to manage and process sensitive data, such as financial transactions, employee records, intellectual property, or other critical business information, while ensuring that the data remains secure and protected from unauthorized access or tampering. In a TEE, the enterprise application is executed within a separate, isolated environment from the main operating system. This separation helps to protect the application and its data from potential vulnerabilities in the operating system or other applications running on the device. The TEE also provides a secure environment for cryptographic operations, secure storage of sensitive data, and secure communications between different components of the enterprise system. Examples of enterprise applications that could benefit from a TEE include: (1) Mobile banking applications that require secure processing of financial transactions and protection of sensitive customer data; (2) healthcare applications that manage and store confidential patient information and need to comply with strict data privacy regulations; and (3) enterprise resource planning (ERP) systems that process sensitive business data and require protection from potential data breaches or unauthorized access.

Universal Mobile Telecommunications System (UMTS) Terrestrial Radio Access Network (UTRAN) means the radio technology used between mobile terminals and the base stations of 3G UMTS.

User Equipment (UE) means a mobile device connectable to a cellular telecommunications network.

Virtualized Mobility Management Entity (vMME) means a virtualized implementation of the main control plane entity of the network which maintains mobility state of user equipment in a network.

Visitor Location Register (VLR) means a database storing data about mobile phones that recently joined a particular area of a mobile operator's network. The VLR keeps track of roamed mobile phone subscribers and communications with the HLR to determine whether the mobile phone is a permanent or temporary subscriber.

Visited Public Land Mobile Network (VPLMN) means a network that a mobile subscriber roams on when leaving their Home Public Land Mobile Network (HPLMN).

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of verifying a sender as trusted on a mobile network, the method comprising the steps of:
   a. receiving an encrypted message from an enterprise service to a cloud messaging service, the enterprise service and the cloud messaging service having a trusted relationship, the message ultimately directed to a subscriber device;
   b. decrypting the encrypted message at the cloud messaging service and signing a source header for the message with a private key of the cloud messaging service to generate a source header signature, the private key retrieved from a cloud wallet service, a corresponding public key for the cloud messaging service already provisioned to the subscriber device; and
   c. transmitting the message with the signed source header to a Short Message Service (SMS) gateway over short message peer-to-peer protocol, the SMS gateway delivering the message to the subscriber device, the subscriber device having the public key corresponding to the private key of the cloud messaging service wherein the subscriber device accesses the public key of the cloud messaging service to validate the source header signature of the message and communicating a validation result to the subscriber device.

2. The method of claim 1 where if the validation result is invalid the message displayed on the subscriber device is annotated with a visual warning.

3. The method of claim 1 where if the validation result is invalid the message is rejected by the subscriber device.

4. The method of claim 1 where if the validation result is valid the message displayed on the subscriber device is annotated with a visual indicium of validity.

5. The method of claim 1 wherein the message with the signed source header is transmitted to a multimedia messaging service (MMS) gateway.

6. A method for provisioning a key pair having a public key and a private key for securing communication between a cloud messaging service and a subscriber device, comprising:
   a. sending a first identity request from the subscriber device to the cloud messaging service;
   b. sending a generated identity blob request from the cloud messaging service to validation cloud service, which validates the subscriber device;
   c. receiving a device identity response from the validation cloud service at the cloud messaging service and generating a key pair at the cloud messaging service, the key pair comprising a public key and a private key; and
   d. provisioning the public key of the key pair to the subscriber device and provisioning the private key of the key pair to a cloud wallet service accessible by the cloud messaging service whereby communications received by the cloud messaging service and directed to the subscriber device are signed using the private key of the key pair retrieved from the cloud wallet service and the signed communication validated at the subscriber device using the private key of the key pair previously provisioned to the subscriber device.

7. A method for verifying the authenticity of a message transmitted from an enterprise service to a subscriber device through a cloud messaging service, comprising:
   a. transmitting a message from the enterprise service to the cloud messaging service over a secure connection;
   b. fetching a private key from a cloud wallet service at the cloud messaging service;
   c. signing a special header with the private key, attaching the special header to the message, and forwarding the message and special header to a messaging gateway;
   d. delivering the message with the special header from the messaging gateway to the subscriber device;
   e. verifying the special header on the subscriber device using a software component operating on the subscriber device and public key to validate the sender; and
   f. transmitting a delivery receipt from the subscriber device back to the messaging gateway, which confirms the receipt to the cloud messaging service and the enterprise service.

8. The method of claim 7, wherein the message format is transmitted through an SS7 protocol gateway.

9. The method of claim 7, wherein the software component facilitates secure communication and key management on the subscriber device.

10. The method of claim 9, wherein the software component accesses the private key from an isolated and secure area of the subscriber device.

11. The method of claim 7, wherein the delivery receipt includes additional information, such as the time of message delivery or the status of the message read by the recipient, to provide feedback to the enterprise service.

12. The method of claim 7 further comprising the step of generating a second signature associated with content in the message.

13. The method of claim 12 wherein the second signature is placed in a field in the special header whereby the message contains two distinct signatures, one that verifies the authenticity of the sender and one that verifies the integrity of the message content.

14. The method of claim 12 wherein the second signature associated with content in the message is signed by the same private key used to sign the special header and the content verified using the same public key used to validate the special header and thus the sender of the message.

* * * * *